United States Patent [19]

Derimiggio et al.

[11] Patent Number: 4,951,096
[45] Date of Patent: Aug. 21, 1990

[54] SELF-CALIBRATING TEMPERATURE CONTROL DEVICE FOR A HEATED FUSER ROLLER

[75] Inventors: John E. Derimiggio, Fairport; Hal E. Wright, Rochester, both of N.Y.

[73] Assignee: Eastman Kodak Company, Rochester, N.Y.

[21] Appl. No.: 373,120

[22] Filed: Jun. 26, 1989

[51] Int. Cl.⁵ ............................................. G03G 15/20
[52] U.S. Cl. ................................... 355/285; 219/216
[58] Field of Search ...................... 355/285, 289, 290; 374/1, 160, 164; 219/216, 469, 470, 471, 472; 338/22 R

[56] References Cited

U.S. PATENT DOCUMENTS

| | | |
|---|---|---|
| 2,938,385 | 5/1960 | Mach et al. . |
| 3,357,249 | 12/1967 | Bernous et al. . |
| 3,499,310 | 3/1970 | Hundere et al. ........................ 374/1 |
| 4,001,545 | 1/1977 | Wada et al. ..................... 219/471 X |
| 4,011,552 | 3/1977 | Quirke ................................ 374/1 X |
| 4,162,847 | 7/1979 | Brandon .............................. 355/285 |
| 4,350,870 | 9/1982 | Nakayama et al. . |
| 4,367,037 | 1/1983 | Nishikawa . |
| 4,415,800 | 11/1983 | Dodge et al. . |
| 4,425,494 | 1/1984 | Enomoto et al. . |
| 4,493,984 | 1/1985 | Yamauchi . |

FOREIGN PATENT DOCUMENTS 0092980 4/1988 Japan ................................... 355/285

Primary Examiner—A. T. Grimley
Assistant Examiner—William J. Royer
Attorney, Agent, or Firm—Tallam I. Nguti

[57] ABSTRACT

A temperature control device, for controlling, at a desired set point, the temperature of an environment or member being heated or being cooled, is particularly suitable for controlling the temperature of a heated electrostatographic fuser roller. The device includes a large tolerance, low precision temperature sensing element that is encapsulated in a compound that has a known and precise solid/liquid phase change melting or freezing point approximately at such a desired temperature set point. The device also includes a control unit which during a warmup or a cool-down period for the environment or member, for example, the heated fuser roller, repeatedly monitors the temperature of the encapsulated sensing element in order to detect the phase change point, for example, the melting point of the encapsulating compound. The phase change point, when so detected, is then utilized by the control unit to responsively self-calibrate the control device, thereby substantially increasing its overall precision in controlling the temperature of the environment or member.

14 Claims, 3 Drawing Sheets

SELF-CALIBRATING TEMPERATURE CONTROL DEVICE FOR A HEATED FUSER ROLLER

BACKGROUND OF THE INVENTION

This invention relates to temperature control devices and more particularly to a self-calibrating temperature control device that produces substantially precise temperature control while utilizing an ordinarily low precision, large tolerance commerically available temperature sensing element.

The use of temperature sensing elements, such as thermistors, in devices for controlling the temperature of environments of members being heated or being cooled, is well known. Particularly, the use of such devices for controlling the temperature of a heated fuser roller in an electrostatographic copier or printer is known, as disclosed for example in U.S. Pat. No. 4,415,800, issued Nov. 15, 1983 to Dodge et al, and U.S. Pat. No. 4,493,984, issued Jan. 15, 1985 to Yamauchi. Such use, unfortunately, can be unacceptable where it attempts to rely on mass-produced and commerically available temperature sensing elements, such as thermistors, which can have large tolerances ranging from plus or minus 5% to as high as plus or minus 20%. Tolerances of this magnitude, of course, are certain to produce significant temperature control set point errors or variations. In controlling the temperature, for example, of a heated fuser roller in an electrostatographic copier or printer, such errors and variations are undesirable because they can result in poorly fused images, as well as, in curled and even charred copies.

Additionally, the use of such temperature sensing elements can, in the alternative, be very expensive. This is because greater heating or cooling control and precision can be achieved, if small tolerance, high precision elements such as plus or minus 1% tolerance thermistors are used instead of ordinary commercially available ones. However, the cost of 1% thermistors, as an example, is unfortunately much higher than that of malss-produced, commercially available thermistors. In fact, it is not uncommon for the cost of 1% thermistors to be as much as 250% more than the cost of commercially available plus or minus 5% thermistors.

SUMMARY OF THE INVENTION

It is an object of the present invention to provide an effective device for controlling, at a desired set point, the temperature of a member or environment being heated or being cooled.

It is another object of the present invention to provide a simple, and inexpensive device for controlling the temperature of a heated member or environment, for example, a fuser roller in an electrostatographic fusing apparatus.

It is a further object of the present invention to provide a temperature control device which utilizes a mass-produced, commercially available large tolerance temperature sensing element, but which produces substantially precise temperature control.

In accordance with the present invention, a device for controlling, at a desired set point, the temperature of an environment or a member being heated or cooled by a heat exchange source, includes a temperature sensing element, a compound that has a known and precise melting point or freezing point approximately at such a desired set point, and a control unit connected to the heat exchange source, as well as, to the temperature sensing element. The temperature sensing element, which is supported in temperature sensing relationship with the environment or member, is encapsulated in such compound. In order to detect the solid/liquid phase change melting or freezing point of the compound, the control unit first monitors the temperature of the compound, as sensed by the encapsulated sensing element, and then utilizes such detected phase change point to responsively self-calibrate the overall control device in order to achieve substantially precise temperature control of such environment or member.

Because of such self-calibration, the control device of the present invention is capable of achieving substantially precise temperature control, while utilizing a temperature sensing element that is a large tolerance, low precision sensing element, for example, a plus or minus 5% or greater commercially available thermistor. The device of the present invention is particularly useful for controlling the temperature of a heated fuser roller in an electrostatographic copier or printer.

BRIEF DESCRIPTION OF THE DRAWINGS

In the detailed description of the preferred embodiments of the invention presented below, reference is made to the accompanying drawings in which.

DESCRIPTION OF THE PREFERRED EMBODIMENT

The present invention will be described below with particular reference to an environment or member being heated, for example, the heated fuser roller of an electrostatographic copier or printer. As such, the compount of use of the invention will be selected for its melting point, the heat exchange source will heat the environment or member, and the temperature of such environment or member will be controlled during a warmup period. The present invention, however, is equally useful with respect to other heated environments or members, as well as, for controlling the temperature of environments or members being cooled by a heat exchange source that removes heat from such environment or member. In the the latter case, the compound of the present invention will be selected for its freezing point, and the temperature of such an environment or member will be controlled instead during a cooldown period. The principles for the detection of the solid/liquid phase change point, melting or freezing, and for the self-calibration of the device are the same for heating and cooling cases.

Figure 1:
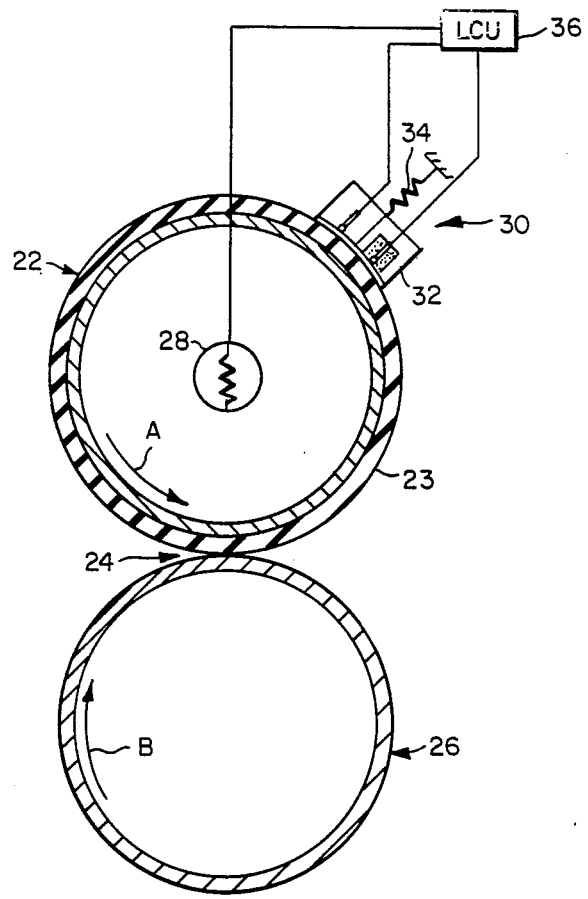
FIG. 1 is a schematic of an electrostatographic fusing apparatus including the device of the present invention.

Referring now to FIG. 1, as apparatus, suitable for fusing toner images in an electrostatographic copier or printer is generally designated 20, and includes a heated roller 22 that forms a fusing nip 24 with a pressure roller 26. The fuser roller 22 has a surface 23 adapted for producing a good finish on fused copies. Fuser roller 22 and pressure roller 26 are drivable by suitable means (not shown) for movement in the directions of the arrows A, B respectively. One of the rollers, for example, fuser roller 22 is heated by a heat exchange source 28, such as a quartz lamp.

In order to operate the apparatus 20, the heat exchange source 28 is first turned on and allowed to supply heat to, and to warm up the fuser roller 22 through a warmup period until the temperature of the surface 23 reaches a desired set point. Thereafter, the apparatus can be used to fuse toner images that are conveyed on a substrate or copy sheet of paper (not shown) through the fusing nip 24. For excellent fusing results, the actual temperature, during fusing, of the surface 23 must thereafter be tightly controlled and maintained at such a desired temperature set point. Such tight control is necessary because an actual temperature of the surface 23 that is significantly below the desired set point will result in incomplete fusing, and one that is significantly above the desired set point may result in curling and possible charring of the substrate or copy sheet.

For such needed tight temperature control, the apparatus 20 therefore includes the temperature control device of the present invention generally designated 30. As shown in FIGS. 1–4, the device 30 includes a temperature sensor 32 that uses temperature sensing elements 40, 42 or 52. As shown in FIG. 1, the sensor 32 is positioned in heat sensing relationship with the surface 23 of the heated fuser roller 22, and is also connected to means, such as a spring 34, which urges the sensor toward the surface 23.

Although the sensor 32 is described here with particular reference to its use on the heated fuser roller 22 of an electrostatographic fusing apparatus, it is equally useful in relation to other members or environments being heated or being cooled. The same is true of the overall temperature control device 30 of the present invention. The description here with particular reference to a heated fusing apparatus is not a limitation, but merely an example of a particular use.

In addition to the sensor 32, the temperature control device 30 further includes a logic and control unit (LCU) 36 which is connected to the heat exchange source 28, and to the temperature sensor 32. Generally, in this arrangement, the environment or member, such as the hot surface 23 of the fuser roller 22, transfers heat from the heat exchange source 28 to the sensor 32, and the sensor 32 then responsively produces an output signal corresponding to the temperature being sensed. A plot of such output signals against time are illustrated, for example, in FIG. 5. The logic and control unit (LCU) 36, as is well known, can then utilize the output signal of the sensor 32 to control the temperature of the environment or member, for example, the surface 23 of the fuser roller 22, at the desired set point. Such control, as is also well known, is achieved by controlling the on/off cycling of the heat exchange source 28.

The precision or tightness of such temperature control about a desired set point, of course, depends primarily on the precision of the sensor 32, or more specifically, on the precision of the particular temperature sensing element 40, 42 or 52 that is used in the senor 32 for controlling the on/off cycling of the heat exchange source 28. Conventionally, it is well known to use expensive high precision small tolerance temperature sensing elements, such as plus or minus 1% thermistors, in order to achieve tight and precise temperature control. This is particularly true in the case of electrostatographic copiers and printers in which tight and precise control is needed for obtaining satisfactory results from the fusing apparatus therein.

Figure 2:
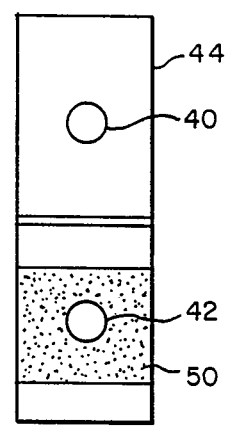
FIG. 2 is an enlarged front section of the sensor unit of a first embodiment of the present invention.
Figure 3:
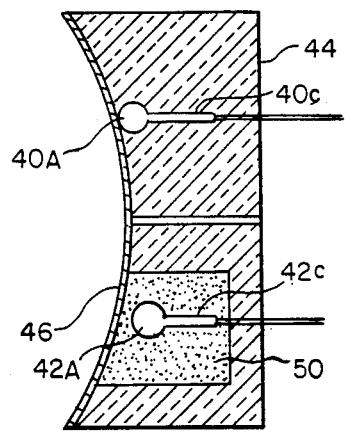
FIG. 3 is an enlarged side section of the sensor unit of FIG. 2.
Figure 4:
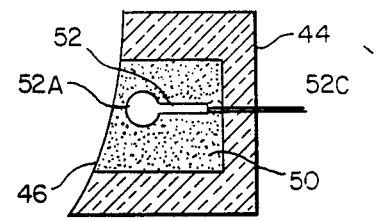
FIG. 4 is a side section of a second embodiment of the present invention.

In the present invention, however, the use of such expensive high precision sensing elements is not necessary for achieving such tight and precise control. As shown in FIGS. 2, and 3, a first embodiment of the temperature control device 30 of the present invention includes first and second temperature sensing elements 40, 42, that can be large tolerance, low precision temperature sensing elements, for example, they can be ordinary commercially available thermistors with tolerances of plus or minus 5% or greater. Sensing elements 40, 42, respectively, have temperature sensing tips or beads 40A, 42A, and wire leads 40C, 42C that are connected to the control unit 36. In addition, the elements 40, 42 are enclosed in a housing 44.

The sidewalls and the rest of the housing 44 can be made of a high temperature plastic, however, one of the sidewalls, for example, a front wall 46 should be made from a strong and thermally conductive material, such as stainless steel. The front wall 46, in addition, should be as thin as practical, for example, 2 mils (0.002"), and should be shaped so as to achieve maximum exposure to, or contact with, the environment or member whose temperature is being sensed. For example, when the device 30 is used for controlling the temperature of a heated fuser roller as shown in FIG. 3, the front wall 46 should be made arcuate, and have a radius of curvature substantially equal to the radius of the surface 23 of the fuser roller 22. Within the housing 44, the sensing elements 40, 42, are positioned such that the tips or beads 40A, 42A, respectively, are in close proximity to the inside of the thermally conductive wall 46.

In addition to the first embodiment of FIGS. 1, 2 and 3, FIG. 4 illustrates a second embodiment of the present invention. As illustrated, the second embodiment includes only a single temperature sensing element 52 which is the same as the elements 40 and 42. Like the elements 40 and 42, the element 52 has a sensing tip or bead 15A, and wire leads 52C that are also connected to a control unit 36. The element 52 is also similarly positioned in a housing 44.

Whether using the first or second embodiment of the device 30 for controlling the temperature of an environment or member, for example, the surface 23 of the heated fuser roller 22, at a desired set point, $T_1$ (FIGS. 6 and 7), sensing elements 40, 42 or 52 should be selected such that the sensor 32 nominally produces an output signal $V_1$ when the temperature sensed is $T_1$. As is well known however, this rarely happens even with sensors using small tolerance, high precision sensing elements. Accordingly, it will ordinarily not happen with the sensor 32 of the present invention, particularly, since its sensing elements 40, 42 or 52 are large tolerance, mass-produced and commerically available plus or minus 5% or greater thermistors.

In fact, it has been found, for example, that attempting to control the temperature of the surface 23 of a heated fuser roller 22 at a desired set point of 170° C using a plus or minus 5% tolerance thermistor, produces errors of plus or minus 15° C about such a set point. Errors of this magnitude will doubtless result in poor fusing and in curled or charred copies, as described above, and are therefore unacceptable for satisfactorily controlling, for example, of the temperature of such fusing apparatus.

Therefore in the present invention, in order to substantially prevent such errors, and thereby make the senor 32 more precise, the sensor 32 further includes a thermally conductive compound 50, as shown in FIGS. 1-4. The compound 50 preferably should have a precise and well known solid/liquid phase change melting or freezing point $T_2$ (FIGS. 6, 7), as well as, a significantly high heat of fusion. Additionally, the compound 50 is selected so that the phase change point $T_2$ is approximately at the desired set point temperature $T_1$ of the environment or member whose temperature is being controlled. In the case of environments or members being cooled, $T_2$ should be at or just above $T_1$, while in the case of environments or members being heated, $T_2$ should preferably be at or just below $T_1$.

When the device 30 is to be used for controlling the temperature of an electrostatographic fusing apparatus at a fusing temperature set point of 170° C. (typical for most electrostatographic copiers and printers using powder toners), the compound 50 can, for examples, be ascorbic acid having a melting point of 169° C.; Adipic acid having a melting of 152° C.; or Triphenyl Carbonal having a melting point of 163° C.

In general, however, the compound 50 actually selected would depend on the particular application, and on the relationship of its solid/liquid phase change melting or freezing point $T_2$ (FIGS. 6 and 7) to the desired set point temperature $T_1$ for such application. Again, it is preferable for most applications that the compound 50 be selected so that the point $T_2$ is approximately at the set point temperature $T_1$ for the application. However, for some specific applications, especially those in which the desired set point temperature $T_1$ is not likely to be revised, the compound 50 can be selected so that the point $T_2$ is substantially at, i.e., equal to, the desired set point temperature $T_1$.

As shown in FIGS. 1-4, the compound 50 is used in the present invention to encapsulate the temperature sensing element 42 of the elements 40, 42 of the first embodiment, and the single element 52 of the second embodiment. To encapsulate such elements effectively, the compound 50 should fully surround the temperature sensing tip or bead 42A or 52A, thereby spacing such tip from the inside of the front wall 46 of the housing 44. In addition, only as much of the compound 50 as is necessary to encapsulate or fully surround such tip should be so used. Given such encapsulation, when the sensor 32 is positioned in heat transfer relationship with an environment or member, for example, the surface 23 of the heated fuser roller 22, and the heat exchange source 28 is turned on, eventually heat from the surface 23 will be transferred to, and through the conductive front wall 46, into the housing 44.

Within the housing 44, such heat will heat up both the temperature sensing element 40 and the compound 50 that encapsulates the temperature sensing element 42 of the first embodiment or 52 of the second embodiment. As such, in the first embodiment, the temperatures of the element 40, and of the compound 50, will initially be raised equally and simultaneously by such heat. In the case of environments or members being cooled, the flow of heat is of course reversed, and the temperatures instead of being raised, will be lowered due to heat loss.

Figure 5:
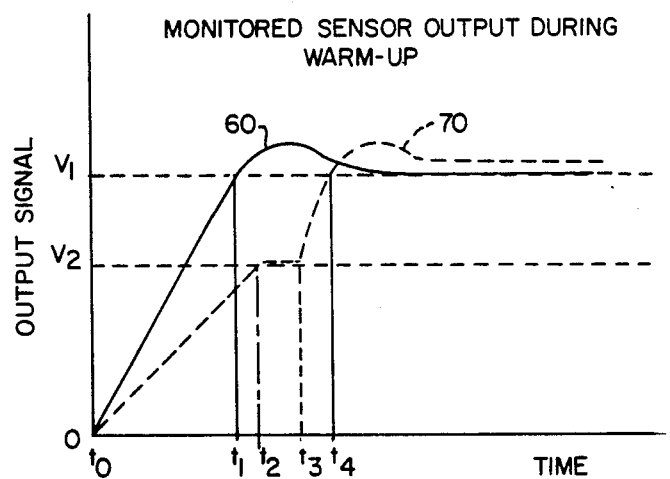
FIG. 5 is a graphical illustration of the method of the present invention for detecting the melting point of the encapsulating compound.

Because of encapsulation by the compound 50, the temperature sensed and indicated by the encapsulated sening element 42 or 52, as represented by the corresponding output signal curve 70 (FIG. 5), will substantially be the temperature of the compound 50. As such, the temperature sensed by the element 42 or 52 will include the solid/liquid phase change melting or freezing point of the compound 50 as indicated by the output signal $V_2$ at time $t_2$ (FIG. 5). The curve 70 therefore can be appropriately monitored during a warmup or a cooldown period in order to detect the point $T_2$ representing the phase change in the compound 50.

Accordingly, the control unit 36 of the device 30 therefore includes means for frequently monitoring the curve 70 during the warmup or cooldown period when the environment or member is being heated up or cooled down to its desired temperature set point $T_1$. FIG. 5 illustrates the case of environments or members being heated, for example, the heated fuser roller 22. When the heat exchange source is first turned on at time $t_o$, the output signal curve 60 corresponding to the temperature of the heated surface 23 as sensed by the unencapsulated sensing element 40 (of the firse embodiment (FIGS. 1-3)), ordinarily will rise continuously until it reaches the point at time $t_1$ where its value is $V_1$ apparently corresponding to the nominal set point temperature $T_1$. Ordinarily, the device 30 will initially be calibrated to control the on/off cycling of the heat source 28, and hence the temperature of the surface 23, at the output signal $V_1$ of the element 40, 42, or 52. In the case where the controlling element is the unencapsulated element 40, such cycling of the heat exchange source 28 will accordingly, and appropriately be exercised at such time $t_1$ when the output signal from the element 40 is $V_1$.

On the other hand, when the heat exchange source 28 is first turned on at time $t_o$, the output signal curve 70 corresponding to the temperature of the compound 50 as sensed by the encapsulated element 42 or 52, will first rise continuously until it reaches the point a time $t_2$ where its value is $V_2$ apparently corresponding to the melting point $T_2$ of the compound 50. Then from time $t_2$ to time $t_3$, there will be no change in the value of the output signals $V_2$ of the element 42 or 52 since there will be no change in the actual temperature of the compound 50. This occurs because the heat supplied to the compound 50 between time $t_2$ and $t_3$ is used up by the compound 50 for melting, that is, as its heat of fusion, and is therefore not available for raising its temperatures or the corresponding output signal.

However, continued heating of the compound 50 after time $t_3$ will see the output signals 70 which correspond to the temperature of the compound 50, as sensed by the encapsulated sensing element 42 or 52, again start rising until the curve 70 also reaches the point at $t_4$ where its value is also $V_1$. Again based on the initial calibration of the device 30, this signal $V_1$ from the encapsulated element 42 or 52 can be used appropriately to control the cycling of the heat exchange source 28, and hence the temperature of the member, for example, the surface 23 of the heated fuser roller 22.

However, because of the large tolerance, low precision nature of the elements 40, 42 and 52 of the device 30, attempting to appropriately control the cycling of the heat exchange source 28 as above, based only on the initial calibration of the device 30, will not yield precise results. As described above, despite such initial calibration, the actual performance of the sensing elements 40, 42, or 52 will ordinarily include temperature set point control errors or variations. Such errors or variations are of course likely to cause each element, despite such initial calibration, to put out the nominal signal $V_1$ at some time other than the time when the precise set point temperature of the particular environment or member, for example, the surface 23, has been reached.

To substantially eliminate such set point control errors or variations in the present invention, the control unit 36 therefore first utilizes the characteristics of the curve 70 as described above to detect the actual solid/liquid phase change point, for example, the melting point $T_2$ (FIGS. 6 and 7) of the compound, and then next utilizes the detected point $T_2$ to self-calibrate the device 30. For example, the control unit 36 accordingly first monitors the output signals 70 for the actual melting point $T_2$ of the compound 50 by frequently and repeatedly reading output signals, $V_i$ (i=0, . . . n, n+1), from the encapsulated sensing element 42 or 52, starting at time $t_o$. The unit 36 after each reading then compares such a reading, for example, $V_{n+1}$, with the previous reading $V_n$, by subtracting $V_n$ from $V_{n+1}$, i.e., $(V_{n+1}-V_n)$.

Depending on the size and power of the heat exchange source 28, the monitoring interval for such readings, $V_i$ (i=0, . . . n, n+1), should be selected such that when the output signal curve 70 is actually rising, that is, actually increasing, the calculation $V_{n+1}-V_n$ will result in a significant quantity that is greater than zero. As such, the calculation $V_{n+1}-V_n$ will equal zero only when the slope of the curve 70 reaches a flat portion, as shown for example between times $t_2$ and $t_3$ (FIG. 5). As described above, this flat portion represents the time during which the compound 50 is using any heat being received from the heated environment or member, for example, the surface 23, for melting and not for raising its temperature or the corresponding output signals. The flat portion also represents the freezing point and the time during which the compound 50 is losing heat (heat of fusion) but its temperature and corresponding output signals are constant and are not falling.

It is therefore accurate to conclude that the temperature of the compound 50, as sensed by the encapsulated element 42 or 52, is actually at the melting point $T_2$ (FIGS. 6 and 7) at the first instance the calculation $V_{n+1}-V_n$ equals zero. This conclusion will be true regardless of the actual value of the output signal $V_n$ of the encapsulated element 42 or 52, and regardless of how far off it is from its initial calibration or expected value $V_2$. Accordingly, in monitoring the curve 70, once the calculation $V_{n+1}-V_n$ equal zero, the control unit 36 will read, as well as, note the value and time of $V_n$, and will recognize them as representing substantially the output signal and time marking the actual detection of the melting or freezing point $T_2$ of the compound 50. The same is true with respect to the detection of the freezing point of the compound 50 in cases involving cooling.

Thus detected, the actual melting or freezing point $T_2$ of the compound 50 can thereafter be utilized by the control unit 36 to self-calibrate the device 30. For such self-calibration, the control unit 36 utilizes, in a manner as illustrated in FIGS. 6 and 7 and described below, a constant $D_1$ (FIGS. 6, 7) together with the actual output signal $V_n$ that was read and noted at the time of detecting, as above, the actual point $T_2$ of the compound 50.

The contant $D_1$ is predetermined, in a manner as illustrated below, from FIGS. 6 and 7 for cases involving heating. In FIGS. 6 and 7, the curve $P_N$ represents the nominal (output signal-temperature) curve, for example, of sensing elements 40, 42 (FIG. 3). The curve $P_N$ shows the desired temperature set point $T_1$ for the heated environment or member, for example, the surface 23, having a corresponding nominal output signal $V_1$ (point A). It also shows the melting point temperature $T_2$ of the compound 50 having a corresponding nominal output signal $V_2$ (point B), and as preferably being close, but just below $T_1$, and the temperature $T_2$ Note, of course, that in some specific applications, the compound 50 can be selected so that $T_2$ is substantially equal to $T_1$. Ordinarily however, as shown in FIGS. 6 and 7, $T_1$ and $T_2$ are different, and the difference between their corresponding output signal nominal values $V_1$ and $V_2$ (FIGS. 6 and 7) is the constant $D_1$, marked by the points B and C.

Figure 6:
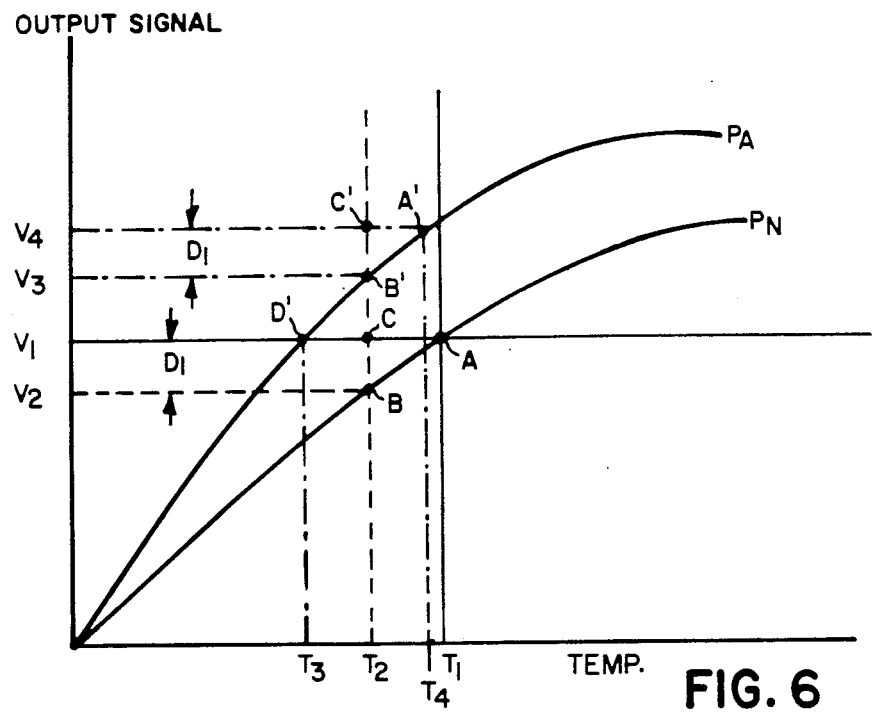
FIG. 6 is a graphical illustration of the self-calibrating feature and precision of the device of the present invention in the case of a negative tolerance sensing element.
Figure 7:
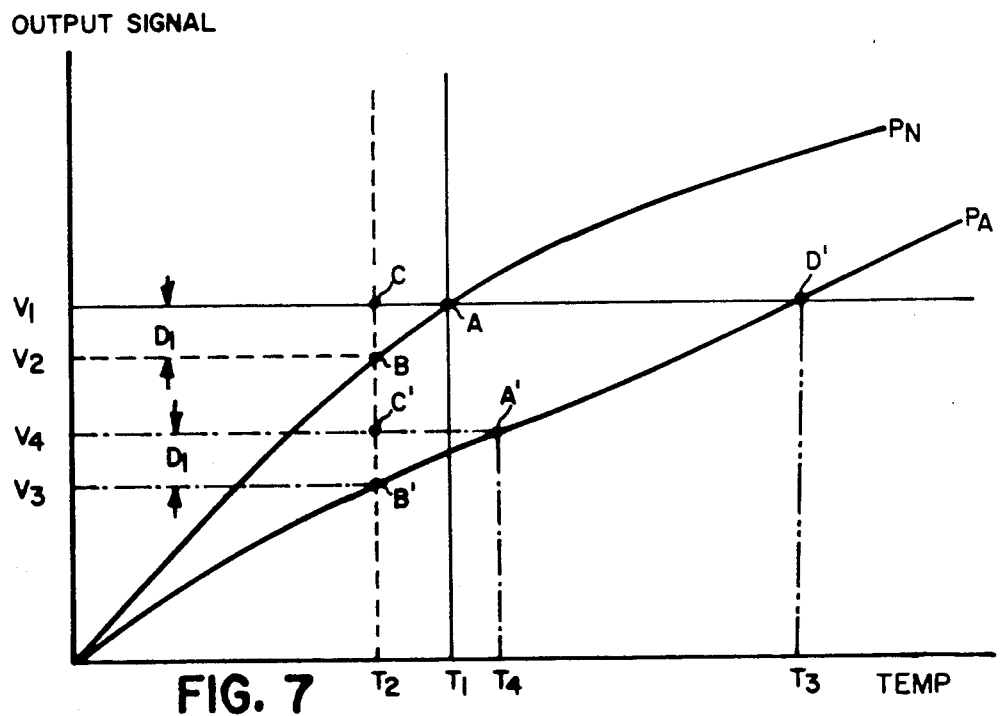
FIG. 7 is like FIG. 6 except it illustrates the case of a positive tolerance sensing element.

FIGS. 6 and 7 also illustrate the use of this constant $D_1$ together with the read and noted actual output signal $V_n$ (corresponding to the detected melting point $T_2$ of the compound 50) for self-calibrating the device 30. FIG. 6 illustrates such use in the case of a batch of sensing elements, such as the thermistors 40, 42, for which the actual output signals $V_i$, (i=0, . . . n, n+1), as indicated by the curve $P_A$, are greater than their nominal or expected output signals indicated by the nominal curve $P_N$. As the curve $P_A$ shows, an element from this particular batch, based only on initial calibration, as described above, will in error put out the initial set point output signal value $V_1$ (point D') at a time when the actual temperature of the heated environment or member, for example, the surface 23, is only $T_3$, not $T_1$. Note that this temperature $T_3$ in this type of case is reached long before actual detection of the melting point $T_2$ of the compound 50 in the manner described above, and that $T_3$ is a long way below the desired temperature set point $T_1$. Because the unencapsulated and encapsulated sensing elements 40, 42 or 52 are from the same batch, they are reasonably assumed to be nominally identical, and so the performance of the encapsulated element 42 or 52 will also follow the curve $P_A$. In addition, the encapsulated element 42 or 52 will also in error produce the output signal $V_1$ (point D') at a time when the actual temperature of the heated environment or member, for example, the surface 23, and hence that of the compound 50, is also only $T_3$.

However, with the control unit 36 monitoring the output signals 70, as described above, the device 30 will recognize the fact that the actual melting point $T_2$, as illustrated, has not yet been detected. Consequently, the device 30, despite its initial calibration to control at the output signal $V_1$, will disregard the early and premature output signal $V_1$ together with its erroneous corresponding temperature $T_3$, and will instead wait for actual detection of the melting point $T_2$ in the manner described above. As illustrated in FIGS. 6 and 7, such actual detection of the melting point $T_2$ of the compound 50 will occur at a time when the output signals from the temperature sensing elements 40, 42, or 52, are each substantially $V_3$, (point B'). When viewed in the output signal-time frame of FIG. 5, the signal $V_3$, of course, will be equivalent of the signal $V_n$ or $V_{n+1}$ for which, as described above, $V_{n+1}-V_n$ will equal zero. As such, the value of the signal $V_3$ will be read and noted.

Thereafter, to self-calibrate the device 30, the control unit 36 will reset the device 30 so that it will appropriately control the cycling of the heat exchange source 28, not when the output signal is $V_1$ as initially calibrated, but when the output signal is a new value $V_4$, which is higher than the read and noted output signal $V_3$, exactly by an amount equal to the constant $D_1$. Such an output signal $V_4$, (where $V_4=V_3+D_1$), corresponds to a temperature $T_4$ at which the heat exchange source 28 should be appropriately cycled in order to come substantially as close as possible to precisely controlling the temperature of the environment or member, for example, the surface 23, at its desired set point $T_1$. As shown in FIGS. 6 and 7, the temperature $T_4$ achieved in this manner after self-calibration of the device 30, is much closer to the desired set point temperature $T_1$ than was the temperature $T_3$ achieved based only on initial calibration of the device 30.

In other words, once the control unit 36 actually detects the melting point $T_2$ of the compound 50, it will read and note the corresponding output signal $V_3$. Thereafter, the output signal being unsed to control the cycling of the heat source 28, will be allowed to increase only from $V_3$ to $V_4$ (where $V_4=V_3+D_1$). The increase $D_1$ based on nominal or expected performance of the sensing element 42 or 52 is such as would allow the actual temperature of the heated environment or member, for example, the surface 23, to only increase from the melting point $T_2$ to $T_4$. As illustrated in FIGS. 6 and 7, in the effort to approximate the temperature $T_1$, the temperature $T_4$ achieved after such recalibration is substantially more precise than the temperature $T_3$.

In FIG. 7, the curves $P_N$, $P_A$, the output signals $V_1$-$V_4$, and the temperatures $T_1$-$T_4$, are the same as referred to in FIG. 6. However, FIG. 7 illustrates the case of sensing element for which the actual values of output signals, as indicated by the curve $P_A$, lag the nominal or expected values indicated by the curve $P_N$. Even in such a case, as illustrated, the temperature $T_4$ achieved after the self-calibration of the device 30, as described above, is clearly a much closer approximation of the desired set point temperature $T_1$ than was the temperature $T_3$.

The present invention therefore can be utilized effectively to achieve substantially precise temperature control, at a desired set point, of an environment or member, for example, a surface 23 of a heated fuser roller 22 in an electrostatographic copier or printer. It again should be noted that when using the present invention with respect to environments or members being cooled, the flat portion of the curve 70 will signal the freezing point, and such freezing point $T_2$ should preferably be just above the desired set point $T_1$. The constant $D_1$ will accordingly be a decrease from $T_2$. However, the principles for detecting the point $T_2$, and for self-calibrating the device 30 using the constant $D_1$ will be the same for cooling cases as they are for heating cases.

While the invention has been described with particular reference to preferred embodiments thereof, it will be understood that variations and modifications can be effected within the spirit and scope of the invention.

We claim:

1. In an electrostatographic copier or printer, a device for controlling the heat source, and hence the temperature of a heated fuser roller at a desired set point, the device including:
    (a) a compound having a known and precise melting point;
    (b) a housing containing said compound, said housing including a thermally conductive wall supported in heat transfer relationship with the heated fuser roller so as to allow the heated fuser roller to heat said compound;
    (c) a first temperature sensing element for sensing the temperature of said compound, said element producing output signals corresponding to the temperatures sensed;
    (d) a second temperature sensing element supported in heat sensing relationship with the heated fuser roller for directly sensing the temperature of the heated fuser roller; and
    (e) a control unit connected to the heat source of the heated fuser roller, and to said temperature sensing elements, said control unit including means for detecting the melting point of said compound, as well as, means responsive to the detected melting point for calibrating said device.

2. The device of claim 1 wherein said compound is selected such that said melting point is close to, but just below, the desired fusing temperature set point for the heated fuser roller.

3. The device of claim 1 wherein said compound is selected such that the melting point is substantially at, or equal to, the desired fusing temperature set point.

4. the device of claim 1 wherein such compound has a significantly high heat of fusion.

5. The device of claim 1 wherein said temperature sensing element is encapsulated in said compound.

6. The device of claim 1 wherein said temperature sensing element is a thermistor.

7. The device of claim 1 wherein said control unit, in order to detect the melting point of said compound, periodically and frequently reads and notes the output signals corresponding to the temperatures of said compound as sensed by said temperature sensing element, and then calculates a net change, if any, between each such reading and its preceding reading.

8. The device of claim 1 wherein said control unit, responsively to said detected melting point of said compound, controls the cycling of the heat source of the heated fuser roller at a control temperature that is correspondingly determined by adding a nominal constant, equal to the difference between the nominal output signals of the sensing element at the melting point temperature and at the desired temperature set point, to the output signal indicated by said temperature sensing element when the melting point is so detected.

9. A device for controlling the temperature of a environment or member, the device including:
    (a) a first temperature sensing element supported in temperature sensing relationship with the environment or member for directly sensing the temperature thereof;
    (b) a compound, having a known and precise solid/liquid phase change melting or freezing point, supported at substantially the same temperature sensing relationship with such environment or member as is said first temperature sensing element;
    (c) a second temperature sensing element encapsulated in said compound for sensing the temperature of said compound; and
    (d) control means, connected to said first and said second temperature sensing elements, for controlling the temperature of the environment or member by detecting said solid/liquid phase change point of said compound, and by recalibrating said first sensing element responsively to said detected phase change point.

10. The device of claim 9 wherein said first and said second temperature sensing elements are thermistors.

11. A temperature sensor including:
    (a) a first temperature sensing element having a heat sensitive portion;
    (b) a second temperature sensing element for directly sensing the temperature of such environment or member; and
    (c) a compound having a known and precise solid/liquid phase change melting or freezing point, said compound substantially encapsulating said first temperature sensing element, such that said first temperature sensing element senses the temperature of said compound.

12. The temperature sensor of claim 11 wherein said temperature sensing element is a thermistor.

13. The sensor of claim 8 wherein said second temperature sensing element is also a thermistor.

14. A device for sensing the temperature of an environment or member being heated or cooled, the temperature of which is gradually being raised or lowered to a given temperature value, the device including:
    (a) a compound having a known and precise solid/liquid phase change melting or freezing point approximately at said given temperature value;
    (b) a first temperature sensing element having an output that varies with temperature, said sensing element being encapsulated in said compound;
    (c) a second temperature sensing element having an output signal that varies with temperature for directly sensing the temperature of such environment or member; and
    (d) a control unit connected to said sensing elements for monitoring said output of said sensing elements, said control unit including means for detecting the solid/liquid phase change melting or freezing point of said compound by looking for a lack of change in said output of said first sensing element, and means for calibrating said device in response to such detected phase change melting or freezing point.

* * * * *